(12) United States Patent
Zhang et al.

(10) Patent No.: US 6,713,548 B1
(45) Date of Patent: Mar. 30, 2004

(54) WATERBORNE POLYMER COMPOSITIONS

(75) Inventors: Sukun Zhang, Mt. Pleasant, SC (US); Charles Andrew Rumble, Goose Creek, SC (US); Warunee Srisiri-Sisson, Daniel Island, SC (US); Marc Stephen Moisa, Charleston, SC (US); James George Hayden, Isle of Palms, SC (US)

(73) Assignee: MeadWestvaco Corporation, Stamford, CT (US)

( * ) Notice: Subject to any disclaimer, the term of this patent is extended or adjusted under 35 U.S.C. 154(b) by 171 days.

(21) Appl. No.: 09/904,224

(22) Filed: Jul. 12, 2001

Related U.S. Application Data

(63) Continuation-in-part of application No. 09/376,516, filed on Aug. 18, 1999, now abandoned.

(51) Int. Cl.⁷ .......................... C08F 8/00; C08F 255/02; C08L 51/08
(52) U.S. Cl. ................ 524/458; 524/502; 524/504; 524/590; 524/322; 525/192; 525/301.5; 525/133.5; 525/39; 526/318.5
(58) Field of Search ................ 524/458, 502, 524/504, 590, 322, 503, 572; 525/192, 301.5, 133.5, 39, 191, 221, 246, 308; 526/318.5

(56) References Cited

U.S. PATENT DOCUMENTS

| | | |
|---|---|---|
| 347,200 A | 8/1886 | Robinson et al. |
| 3,105,823 A | 10/1963 | Boenau |
| 4,013,627 A | 3/1977 | Temple |
| 4,117,199 A | 9/1978 | Gotoh et al. |
| 4,147,851 A | 4/1979 | Raynolds |
| 4,327,121 A | 4/1982 | Gray, III |
| 4,371,669 A * | 2/1983 | Mylonakis et al. ......... 525/329 |
| 4,525,423 A | 6/1985 | Lynn et al. |
| 4,894,397 A * | 1/1990 | Morgan et al. ............. 525/308 |
| 4,923,940 A | 5/1990 | Hsu |
| 5,338,345 A | 8/1994 | Scarborough et al. |
| 5,425,991 A | 6/1995 | Lu |
| 5,654,039 A | 8/1997 | Wenzel et al. |
| 5,725,789 A | 3/1998 | Huber et al. |
| 6,103,802 A | 8/2000 | Zhang et al. |
| 6,429,247 B1 | 8/2002 | Shah et al. |
| 6,433,052 B1 | 8/2002 | Shah et al. |
| 6,437,033 B1 | 8/2002 | Shah et al. |
| 6,437,037 B1 | 8/2002 | Hutter |

OTHER PUBLICATIONS

U.S. application Ser. No. 09/854367, Zhang, filed May 2001.*
U.S. application Ser. No. 10/324173, Arnauld, filed Dec. 2002.*
Eastman.com. "Adhesives & Sealants" Aug. 26, 2003 on line available: http://www.eastman.com/Markets/Adhesives_and_Sealants/Wax_B1...
Eastman.com. "FAQ" Aug. 26, 2003 on line available: http://www.Eastman.com/FAQs/FAQ_C1_0025.asp.
Acwax.com, Jan. 2002, "A–C® Oxidized Polyethylene 392" Aug. 26, 2003 on line available: http://www.acwax.com.
Acwax.com. "A–C® Performance Products Applications—Polish"pp. 15 and 16. Aug. 27, 2003 on line available: http://www.acwax.com.applications.applications.html.
Acwax.com. "A–C® Performance Products Applications—Main Application Polish", p. 15,Aug. 27, 2003 on line available: http://www.acwax.com/applications/benefits.html.

* cited by examiner

Primary Examiner—Rabon Sergent
Assistant Examiner—Olga Asinovsky
(74) Attorney, Agent, or Firm—Daniel B. Reece, IV; Terry B. McDaniel

(57) ABSTRACT

This invention relates to waterborne polymer compositions and their applications. More particularly, the invention relates to the utilization of water-dispersible polymers and fatty acid as surface-active agents in emulsion polymerization reactions to produce waterborne polymer compositions which exhibit superior grease, water, and chemical resistance properties.

18 Claims, No Drawings

WATERBORNE POLYMER COMPOSITIONS

This application is a continuation-in-part of our commonly assigned, U.S. patent application Ser. No. 09/376,516 filed Aug. 18, 1999 now abandoned, entitled "Acrylic Water-Based Release Coatings for High Pressure Laminates".

FIELD OF INVENTION

This invention relates to waterborne polymer compositions and their applications. More particularly, the invention relates to the utilization of water-dispersible polymers and fatty acid as, surface-active agents in emulsion polymerization reactions to produce waterborne emulsion polymer compositions which exhibit superior grease, water, and chemical resistance properties.

BACKGROUND OF THE INVENTION

Cellulosic fiber products (such as paper, paper board, corrugated paper board, hard board, fiber board, gypsum board, chip board, and the like) have been used for many years in a variety of end uses. These products have the advantages of being relatively inexpensive and readily available. However, these products readily absorb water when exposed to environments where standing water, aqueous mists, aqueous spray, or high humidity is present. Such exposure usually results in a degradation of properties and a loss of strength. Accordingly, it has been a common practice to coat or impregnate cellulosic fiber products with various hydrophobic materials (such as waxes or synthetic resins) in an attempt to impart water and grease resistance properties.

Water-resistant paper is generally produced by first impregnating or coating the paper substrate with a wax melt, wax solution, or wax emulsion, after which the substrate is dried at a temperature lower than the melting point of the wax. The overcoat film of wax allows the paper to have high hydrophobic and water-resistant properties. Should the paper be dried at a temperature higher than the melting point of the wax, the melted wax tends to penetrate into the inside of the paper substrate instead of forming the overcoat film on the paper. However, when the overcoat is applied at a temperature below the melting point of the wax, the overcoat is often brittle. If the paper is subsequently folded, this brittleness often results in poor moisture and water-resistant properties at the creased portion of the coated paper. Furthermore, such waxed paper has relatively poor moisture resistance properties and is difficult to repulp. Also, paper that is wax treated cannot be printed with water or solvent based inks using flexographic or gravure type printing presses. Finally, the moisture and water-resistance properties of the waxed paper normally begin to decrease within about two months of the production of the paper (see U.S. Pat. Nos. 347,200 and 4,117,199). These characteristics limit the employment of wax overcoated paper and paperboard in consumer packaging.

Water-resistant paper can also be produced by coating the surface of the paper with a film-forming hydrophobic synthetic resin solution or latex. Polyethylene, polypropylene, polyvinyl chloride, and copolymers of two or more of the mentioned monomers are commonly employed as hydrophobic synthetic resins. The latex or solution of the hydrophobic synthetic resin may be applied in such a manner as to penetrate into the inside of the paper or, alternatively, may be added into the aqueous slurry of the pulp to be incorporated into the paper. This technology provides paper with high degree of water-resistance. However, as the synthetic resin is firmly fixed to the paper substrate, there can be difficulties in the reuse and repulping of the coated paper (see U.S. Pat. Nos. 3,105,823 and 4,117,199).

Water-resistant paper may be made via another process which employs an aqueous slurry of pulp containing a wax emulsion, sizing agent, aluminum sulfate and a thermosetting resin or wet strength resin. However, the resulting paper has relatively poor moisture and water-resistant properties and is difficult to repulp and reuse.

Another method of producing water-resistant paper is to coat the substrate with an aqueous emulsion containing a synthetic rubber latex and a wax emulsion. The coatings are subsequently dried at a temperature the same as or higher than the melting point of the wax. The rubber latex is the copolymer of butadiene with at least one unsaturated monomer (such as methyl methacrylate, styrene, or acrylonitrile). In this method, the ratio of synthetic rubber latex and wax emulsion is critical for the repulpability, moisture and water-resistant properties of the paper. If the amount of wax employed is less than five parts by weight per one hundred parts by weight of the solid synthetic rubber, the resulting moisture and water-resistant paper will be difficult to repulp (because the rubber is firmly fixed to the paper to an excessive extent). On the other hand, if too much wax is utilized, the resulting aqueous emulsion is too brittle to be securely affixed to the paper. When such paper is bent or folded, the creased portion of the paper has very poor moisture and water-resistance properties. If the drying temperature of the coated paper is lower than the melting point of the wax, the paper will have poor moisture and water-resistance properties (see U.S. Pat. No. 4,117,199).

Paper can also be treated with both a water dispersible copolymer comprised of acrylic polymers, styrene butadiene copolymers, or polyvinylidiene chloride and a wax component separately. The copolymer is applied to a paper substrate followed by a second coat of wax in a two-step process (see U.S. Pat. No. 5,654,039).

Several technologies employed to produce water-resistant paper rely on applying a large amount of melted wax, rosin, or modified starch to the surface of the paper substrate at a relatively high temperature. These processes are commonly energy intensive and require substantial amounts of materials in order to provide any substantial water resistance. There is, therefore, a substantial need for a relatively inexpensive waterproofing composition that can be applied to the paper substrate at near ambient temperature. Additionally, the materials employed to provide moisture and water-resistance should be compatible with aqueous glues, inks, and dyes.

Therefore, an object of this invention is to disclose aqueous polymer compositions which exhibit superior moisture and water resistance characteristics.

When coated on a cellulosic substrate, the water-based polymer compositions of the present invention impart superior moisture and water-resistance to the coated substrate. Such coated paper is environmentally friendly in that the paper can be reused and repulped. Moreover, as the present aqueous polymer compositions do not rely on wax to provide the moisture and water-resistance, the coated substrates can be dried at near ambient temperatures (thereby saving energy). Also, the polymer compositions are not brittle. This characteristic permits the coated paper, when folded or bent, to maintain its moisture and water-resistant properties in the creased portion of the paper. Furthermore, the present polymer compositions are compatible with aqueous glues, inks, and dyes.

Water resistance is also critical for coatings applications on other substrates, such as wood, concrete, brick, and masonry. Water tends to penetrate such porous substrates, thereby causing warping and swelling in wood and cracking and spalling of concrete and masonry.

Traditional waterproofing compounds often contain non-volatile water-repellent components (such as waxes, silicone, silane, siloxane, metallic stearate, acrylics, and preservatives) and surface tension modifying chemicals emulsified in a volatile organic liquid carrier. Growing health and environmental concerns have led to strict regulation of the amounts of volatile organic compound (VOC) which can be released after paint is applied. Such regulations have severely limited the employment of certain water-repellent coating compositions.

In U.S. Pat. No. 4,923,940 hydrophobically modified high molecular weight polyacrylic acid copolymers are used as primary emulsifiers for non-volatile water-repellent components in order to provide low VOC water repellent materials. However, the modified polyacrylic acid copolymers are quite viscous and very difficult to apply. High kinetic energy processing (i.e., a microfluidizer) is employed in U.S. Pat. No. 5,338,345 to produce low VOC water repellent materials having a specific viscosity and particle size suitable for normal applications. However, this technology tends to be relatively rigid and non user friendly, as slight deviations of viscosity or particle size can lead to dramatic changes in the stability and water repellency of the vehicle.

Therefore, another object of this invention is to disclose aqueous polymer compositions which exhibit superior water resistance characteristics when applied to wood, concrete, brick, masonry, and other non-cellulosic substrates.

The property of grease resistance is also important in a number of coatings applications. For example, often in the packaging industry a stain or leak-proof barrier is required for paper that comes in contact with oily, greasy, or watery foods. For such uses, polymeric barriers such as polyethylene and wax are relatively expensive and difficult to repulp or reuse. Due to their effectiveness at low concentrations and their adaptability to conventional paper manufacturing processes, fluorochemicals have been used extensively to impart water, oil, and grease resistance to cellulosic substrates. Unlike waxes or film-forming resins, fluorochemicals are not physical barriers. Instead, fluorochemicals function to reduce the surface energy of the coated substrate. The resulting low surface energy prevents wetting or spreading of water and grease (which have higher surface tensions). In U.S. Pat. No. 4,013,627 fluorine containing acrylic polymers were used to reduce the surface energy of a textile substrate in order to provide resistance to water and grease. Likewise, in U.S. Pat. No. 4,147,851 fluorinated acrylic polymers were employed to impart water and grease resistance to a paper substrate. In U.S. Pat. No. 4,525,423 non-polymeric fluorocarbon materials were shown to also lower the surface energy of paper substrates (thereby providing water and grease resistance). While fluorinated materials are relatively expensive when compared to film-forming resins; such materials are reusable, repulpable, and may be effectively applied at lower amounts per ton of paper. However, in recent years various health concerns have reduced the use of fluorochemicals materials. Thus, there exists a need for compositions which: a) provide water, oil and grease resistant to paper or paper products, b) can be employed in conventional paper manufacturing processes, and c) generate paper products with the ability to be effectively repulped and reused properties.

Another objective of this invention is to disclose waterborne polymers compositions which do not contain fluorocarbon materials. These polymer compositions can be applied to paper via conventional paper manufacturing processes in order to produce coated papers which exhibit excellent oil and grease resistances. Moreover, these coated paper can be repulped and recycled into paper and other products.

In the textile industry fluorochemicals are often utilized to render carpeting, upholstery, and other woven fabrics resistant to staining. Such fluorochemicals materials have traditionally contained relatively large amounts of organic solvent. U.S. Pat. No. 5,725,789 discloses a fluorochemical composition with a reduced amount of organic solvent that can be applied at ambient temperatures. Water-based fluorochemical compositions, while more environmentally acceptable, commonly require additional heating steps to evaporate water. Thus, exists a need in the textile industry for a fluorine-free water-borne composition which can be applied at ambient temperatures to woven fabrics in order to impart stain resistance to the coated fabrics.

Accordingly, another objective of the present invention is to disclose fluorine-free water-born polymers compositions which impart exhibit excellent oil and grease resistance to fabrics and other fiber-containing substrates.

Polyethylene films and wax coatings are widely used as moisture barriers in various packaging applications. However, the recycling of such packages is relatively limited and expensive due to the fact that special equipment is required to repulp packaging which contains polyethylene films or wax coatings. Also, most polyethylene films and wax coatings do not degrade when the package is composted. Therefore, a need exists for a polyethylene film alternatives which imparts comparable moisture barrier resistances and which can be repulped or composted.

Another objective of this invention is therefore to disclose waterborne emulsion compositions which, when formulated into a barrier coating, exhibit an excellent moisture vapor transmission resistance (MVTR).

A further objective of this invention is to disclose waterborne polymer compositions which exhibit excellent resistance to various chemicals (including automotive fluids, automotive cleaners, gasoline, skydrol, and the like).

Yet another objective of this invention is to disclose water-borne polymer compositions which can be used to formulate coatings which exhibit excellent chemical resistance.

Another objective of this invention is to disclose aqueous polymer compositions which, when formulated into clear sealer, have good penetration on porous substrates and provide a "wet look" appearance typical of solvent-born coatings.

Yet another objective of this invention is to disclose waterborne polymer emulsion compositions which, when formulated into wood coatings, exhibit excellent chemical resistance, water resistance, wet blocking, and adhesion to the coated wood substrate.

A further objective of this invention is to disclose aqueous polymer compositions which, when formulated into paints, exhibit excellent chemical resistance, scrub resistance, stain resistance, and stain removal.

A further objective of this invention is to disclose waterborne polymer emulsion compositions which, when formulated into barrier coatings, produce an excellent vehicle for application on paper and paper board substrates.

SUMMARY OF THE INVENTION

The objects of this invention are met by producing aqueous polymer compositions via reacting a mixture containing water-dispersible stabilizing polymer, fatty acid, and vinylic monomer in an emulsion polymerization reaction. The water-dispersible polymers and fatty acid are employed as surface-active agents for emulsion polymerization, thereby producing emulsions with superior water, grease, and chemical resistance characteristics. The superior rheology and other application-related properties (i.e. film build, flow and leveling, gloss, wetting, package stability, stain resistance and penetration through porous substrate), cleanability, and resolubility permit these compositions to serve as excellent vehicles for coatings on porous substrates (such as concrete), chalky substrates, and on cellulose-based materials. This combination of resistant characteristics are intriguing in that water and grease have complimentary hydrophilic-hydrophobic natures, thus materials generally possess only resistance to either water or grease, but not both. The aqueous polymer compositions of the present invention is an emulsion technology which exhibits excellent water and grease resistant through sole vehicle (not through the traditional practice of blending of additional hydrophobic additives).

DESCRIPTION OF THE PREFERRED EMBODIMENT

The aqueous polymer compositions of the present invention comprise the reaction products produced by reacting in an emulsion polymerization reaction a mixture comprising:
(a) about 5.0% to about 50.0% by total weight of the mixture of a member selected from the group consisting of water-dispersible polymers having an average molecular weight in the range of about 2,000 to about 12,000 and combinations thereof;
(b) about 2.0% to about 30.0% by total weight of the mixture of a member selected from the group consisting of fatty acids having an acid number of at least 100 and combinations thereof;
(c) about 20.0% to about 93.0% by total weight of the mixture of a member selected from the group consisting of vinylic monomers and combinations thereof;
(d) up to about 3.0% by total weight of the mixture of a chain transfer agent;
(e) up to about 5.0% by total weight of the mixture of a surfactant selected from the group consisting of non-ionic surfactants, anionic surfactants, and combinations thereof;
(f) a catalytic amount of at least one polymerization initiator, and
(g) the balance of the mixture being water; to produce an aqueous polymer composition.

Preferred aqueous polymer compositions comprise the reaction products produced by reacting in an emulsion polymerization reaction a mixture comprising:
(a) about 10.0% to about 30.0% by total weight of the mixture of a member selected from the group consisting of water-dispersible polymers having an average molecular weight in the range of about 5,000 to about 11,000 and combinations thereof;
(b) about 4.0% to about 20.0% by total weight of the mixture of a member selected from the group consisting of fatty acids having an acid number of at least 100 and combinations thereof;
(c) about 50.0% to about 86.0% by total weight of the mixture of a member selected from the group consisting of vinylic monomers and combinations thereof;
(d) up to about 2.0% by total weight of the mixture of a chain transfer agent;
(e) up to about 4.0% by total weight of the mixture of a surfactant selected from the group consisting of non-ionic surfactants, anionic surfactants, and combinations thereof;
(f) a catalytic amount of at least one polymerization initiator; and
(g) the balance of the mixture being water; to produce an aqueous polymer composition.

The vinylic monomers are copolymerized in an aqueous polymerization medium by reacting a mixture of vinylic monomers, fatty acids, water-dispersible polymers, and a catalytic amount of at least one polymerization initiator. Where desired, a surfactant and/or chain transfer agent may be employed to tailor the molecular weight, particle size, and stability of the emulsion. The emulsion polymerization reaction is typically conducted at a temperature within the range of about 30° C. to about 100° C. It is, however, preferred that the polymerization reaction be conducted at a temperature in the range of about 50° C. to about 80° C.

Polymers which are suitable for use in the present invention must be water-dispersible and have a average molecular weight in the range of about 2,000 to about 12,000; with the preferred molecular weights being in the range of about 5,000 to about 1,000. Water-dispersible polymers having an acid number of 100 or less can be utilized in the present invention without neutralization. However, polymers having an acid number of greater than 100 must be neutralized prior to dispersion in an aqueous medium. Aqueous bases suitable for use in neutralizing these polymers to produce water-dispersible polymers include organic and inorganic compounds (such as sodium hydroxide, potassium hydroxide, ammonium hydroxide, amines, sulfates, and the like). The term "water-dispersible polymers" as used herein includes polymers having an acid number of greater than 100 which have been neutralized for dispersion in an aqueous medium. Preferred water-dispersible stabilizing polymers include members selected from the group consisting of acrylic acid, methacrylic acid, fumaric acid, maleic anhydride, and combinations thereof. Polar, non-ionic water-dispersible polymers can also be employed in the present invention.

Fatty acids which are suitable for use in the present invention include those fatty acids having an acid number of at least 100 which contain a range of carbon atoms from about $C_{12}$ to about $C_{24}$, with the preferred range being from about $C_{16}$ to $C_{20}$. It is further preferred that the fatty acid be vegetable, animal, or tall oil based. It is most preferred that the fatty acid be tall oil based and contain from about 15.0% to about 18.0% conjugated double bonds. While from about 2.0% to about 30.0% by total weight of the mixture may be fatty acid, a preferred range of fatty acid is from about 4.0% to about 20.0% by total weight of the mixture. As used herein the term "fatty acid" includes difunctional fatty acids.

Vinylic monomers which are suitable for use in the present invention include styrenic monomers, acrylic monomers, methacrylic monomers, ethylenic monomers, and the like. The term "acrylic monomer" as employed herein includes members of the group consisting of acrylic acid, methacrylic acid, acrylic acid esters, methacrylic acid esters, derivatives of acrylic acid, derivatives of methacrylic acid, and mixtures thereof. Examples of suitable acrylic and methacrylic ester monomers include the $C_1$–$C_{30}$ alkyl ester derivatives.

Methacrylic esters suitable for use in the present invention include, but not limited to, the following: methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate, benzyl methacrylate, allyl methacrylate, 2-n-butoxyethyl methacrylate, 2-chloroethyl methacrylate, sec-butyl-methacrylate, tert-butyl methacrylate, 2-ethybutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2-methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate and tetrahydropyranyl methacrylate.

Acrylate esters suitable for use in the present invention include methyl acrylate, ethyl acrylate, n-propyl acrylate, isopropyl acrylate, n-butyl acrylate, n-decyl acrylate, 2-ethylhexyl acrylate, and the like.

Methacrylic acid derivative acrylic monomers suitable for use in the present invention include methacrylic acid derivatives such as: methacrylic acid and its salts, methacrylonitrile, methacrylamide, N-methylmethacrylamide, N-ethylmethacrylamide, N,N-diethymethacrylamide, N,N-dimethylmethacrylamide, N-phenyl-methacrylamide, methacrolein, and the like.

Acrylic acid derivatives suitable for use in the present invention include: acrylic acid and its salts, acrylonitrile, acrylamide, methyl alpha-chloroacrylate, methyl 2-cyanoacrylate, N-ethylacrylamide, N,N-diethylacrylamide acrolein, and the like.

Ethylenic monomers suitable for use in the present invention include vinyl pyridine, vinyl pyrollidone, sodium crotonate, methyl crotonate, crotonic acid, maleic anhydride, and the like.

Where desired, up to about 3.0% (preferably up to about 2.0%) by total weight of the mixture of a chain transfer agent may be employed in the polymerization reaction in order to lower the molecular weight of the emulsion polymer. Preferred chain transfer agents include, but are not limited to, the following: dodecyl mercaptan, mercaptoacetic acid, mercaptopropionic acid, octyl mercaptan, 2-mercaptoethanol, alkyl mercaptopropionates, and combinations thereof.

Where desired, a surfactant may be employed in the emulsion polymerization reaction in an amount up to about 5.0% by weight of the monomer mixtures. Surfactants suitable for use in the emulsion polymerization reaction include members selected from the group consisting of nonionic surfactants, anionic surfactants, and combinations thereof. Preferred anionic surfactants include alkyl sulfates, ether sulfates, phosphate esters, sulfonates, and the like. Preferred nonionic surfactants include alcohol ethoxylates, alkylphenol ethoxylate, phenol ethoxylate, block copolymers, and the like. Anionic and non-ionic surfactants containing polymerizable groups (known in the art as "polymerizable surfactants") are also suitable for use in the present invention.

A catalytic amount of at least one polymerization initiator is used in the emulsion polymerization reaction. The amount of initiator employed commonly comprises from about 0.5% to about 5.0% (preferably from about 0.5% to about 1.5%) by weight of the total mixture used to produce the emulsion polymer. Traditional emulsion polymerization initiators (such as thermal initiators, redox initiators, and combinations thereof) are suitable for use in the emulsion polymerization reaction. The type of polymerization initiator actually employed is known in the art to depend upon the desired temperature for the reaction. Thermal initiators which are suitable for use include, but are not limited to, the following: hydrogen peroxide, t-butyl hydroperoxide, di-t-butyl peroxide, benzoyl peroxide, benzoyl hydroperoxide, 2,4-dichlorobenzoyl peroxide, t-butyl peracetate, azobisisobutyronitrile, ammonium persulfate, sodium persulfate, potassium persulfate, isopropyl peroxycarbonate, and combinations thereof. Suitable redox initiators include, but are not limited the following: sodium persulfate-sodium formaldehyde sulfoxylate, cumene hydroperoxide-sodium metabisulfite, potassium persulfate-sodium metabisulfite, potassium persulfate-sodium bisulfite, cumene hydroperoxide-iron (II) sulfate, and combinations thereof.

The polymer compositions may be employed to coat fiber-containing substrates in order to impart moisture vapor resistance, water resistance, grease resistance, and/or chemical resistance to the coated substrates. When coating fiber-containing substrates, it is preferred to employ polymer compositions which have a pH of 7 or higher and a solids level in the range of 2.0% to 100.00%. The solids level utilized will depend upon the type of substrate being coated, the manner in which the coating is being applied, and the desired level of moisture vapor resistance, water resistance, grease resistance, and/or chemical resistance to be imparted to the substrate. Furthermore, the polymer composition should be film-forming at room temperature for such applications. Where desired, one may add a film-forming aid (such as solvents, plasticizers, and the like) to the polymer composition. It is well within the ability of one skilled in the art to determine the appropriate pH range, solids level, and film-forming characteristics for such applications.

The polymer compositions may also be employed to formulate aqueous sealants for use on substrates such as wood, concrete, brick, masonary, and the like. Where desired, pigment can be added to the sealant in order to formulate aqueous paints for use on these substrates. When employed in such applications, it is preferred to use polymer compositions which have a pH of 7 or higher and a solids level in the range of 2.0% to 100.00%. The solids level utilized will depend upon the type of substrate being coated, the manner in which the coating is being applied, and the coating characteristics to be imparted to the substrate. Furthermore, the aqueous sealant or aqueous paint should be film-forming at room temperature for such applications. Where desired, one may add a film-forming aid (such as solvents, plasticizers, and the like) to the formulations. It is well within the ability of one skilled in the art to determine the appropriate pH range, solids level, and film-forming characteristics for such applications.

As appreciated in the art, the exact components and properties of components desired for any coating application can vary and, therefore, routine experimentation may be required to determine the optional components and proportions of components for a given application and desired properties.

The following examples are provided to further illustrate the present invention and are not to be construed as limiting the invention in any manner.

EXAMPLE 1

An aqueous emulsion polymer composition was prepared as follows. A round-bottomed flask fitted with a mechanical stirrer, thermometer, nitrogen inlet, and reflux condenser was charged with 468.0 g of deionized water (DIW). The DIW was heated to 72° C. and 72.0 g of MOREZ 101 (a styrene acrylic resin water-dispersible polymer from Morton International), 18.0 g of EMERY 531 (a tallow fatty acid from Henkel Corporation), and 22.5 g of ammonium hydroxide was added to the flask. The resulting mixture was heated until the water-dispersible polymer and fatty acid were completely dissolved in the water. After the pH of the mixture was adjusted to 9.0 via the addition of ammonium hydroxide, 4.5 g of TERGITOL NP-10 (a non-ionic surfactant from Union Carbide) was added to the mixture. Thereafter, a polymerization initiator solution of 2.43 g of ammonium persulfate in 10.0 g DIW was added. A monomer mixture containing 28.8 g of methyl methacrylate, 129.6 g of 2-ethylhexylacrylate, and 129.6 g of butyl acrylate was subsequently fed into the reaction mixture over a period of two hours. After the monomer feed was completed the reaction was held at temperature for 30 minutes, whereupon an additional charge of 0.45 g of ammonium persulfate in 10.0 g DIW and 0.289 g t-butyl hydroxypersulfate was added to the flask to convert any residual monomers. The product was allowed to cool, then filtered through a 325-mesh screen. The resulting aqueous polymer composition (hereinafter referred to as "Emulsion No. 1") had a non-volatile content of 42.0% and pH of 8.5.

EXAMPLE 2

An aqueous emulsion polymer composition was prepared as follows. To a round-bottomed flask fitted with a mechanical stirrer, thermometer, nitrogen inlet, and reflux condenser was charged 468.0 g of deionized water (DIW). The water was heated to 72° C. and 72.0 g of SMA 1000 (a alkali-soluble water-dispersible polymer from Elf-Atochem), 18.0 g of EMERY 531 (a tallow fatty acid from Henkel Corporation), and 40.5 g of ammonium hydroxide was added to the flask. The resulting mixture was heated until the water-dispersible polymer and fatty acid were dissolved. After the pH of the mixture was adjusted to 9.0 via the addition of ammonium hydroxide, 4.5 g of TERGITOL NP-10 (a non-ionic surfactant from Union Carbide) was added to the mixture. Thereafter, a solution of 2.43 g of ammonium persulfate in 10.0 g DIW was added. A monomer mixture of 57.6 g of methyl methacrylate, 115.2 g of 2-ethylhexylacrylate, and 115.2 g of butyl acrylate was subsequently fed into the reaction mixture over period of two hours. After the monomer feed was completed the reaction was held at temperature for 30 minutes, whereupon an additional charge of 0.45 g of ammonium persulfate in 10.0 g DIW and 0.289 g t-butyl hydroxypersulfate was added to the flask to convert any residual monomers. After cooling, the product was filtered through a 325-mesh screen. The resulting aqueous polymer composition (hereinafter referred to as "Emulsion No. 2") had a non-volatile content of 42.0% and pH of 8.75.

EXAMPLE 3

An aqueous emulsion polymer composition was prepared as follows. To a round-bottomed flask fitted with a mechanical stirrer, thermometer, nitrogen inlet, and reflux condenser was charged 468.0 g of deionized water (DIW). The water was heated to 72° C. and 72.0 g of JONREZ H-2702 (an alkali-soluble water-dispersible polymer from Westvaco Corporation), 18.0 g of Westvaco 1480 (a tallow fatty acid from Westvaco Corporation), and 22.5 g of ammonium hydroxide was added to the flask. The resulting mixture was heated until the water-dispersible polymer and fatty acid were completely dissolved. After the pH of the mixture was adjusted to 9.0 via the addition of ammonium hydroxide, a solution of 2.43 g of ammonium persulfate in 10.0 g DIW was added. A monomer mixture of 172.8 g of styrene and 115.2 g of 2-ethylhexylacrylate was then fed into the reaction mixture over a period of two hours. After the monomer feed was completed the reaction was held at temperature for 30 minutes, whereupon an additional charge of 0.45 g of ammonium persulfate in 10.0 g DIW and 0.289 g t-butyl hydroxypersulfate was added to the flask to convert any residual monomers. After cooling, the product was filtered through a 325-mesh screen. The resulting aqueous polymer composition (hereinafter referred to as "Emulsion No. 3") had a non-volatile content of 42.0% and pH of 8.5.

EXAMPLE 4

An aqueous emulsion polymer composition was prepared as follows. A round bottom flask equipped with a mechanical stirrer, thermometer, nitrogen inlet and reflux condenser was charged with 468.0 g of deionized water (DIW). The water was heated to 72° C. and 72.0 g of JONREZ H-2702 (a alkali-soluble water-dispersible polymer from Westvaco Corporation), 18.0 g of Henkel 531 (a tallow fatty acid from Henkel Corporation), and 22.5 g of ammonium hydroxide was added to the flask. The resulting mixture was heated until the water-dispersible polymer and fatty acid were completely dissolved. After the pH of the mixture was adjusted to 9.0 via the addition of ammonium hydroxide, a solution of 2.43 g of ammonium persulfate in 10.0 g DIW was added. A monomer mixture of 115.2 g of methyl methacrylate, 57.6 g of butyl acrylate, and 86.4 g of 2-ethylhexylacrylate was then fed to the reaction mixture over a period of two hours. After the monomer feed was completed the reaction was held at temperature for 30 minutes, whereupon an additional charge of 0.45 g of ammonium persulfate in 10.0 g DIW and 0.289 g t-butyl hydroxypersulfate was added to the flask to convert any residue monomers. The product was allowed to cool, then filtered through a 325-mesh screen. The resulting aqueous polymer composition (hereinafter referred to as "Emulsion No. 4") had a non-volatile content of 42.0% and pH of 8.5.

EXAMPLE 5

The water resistance and grease resistance properties of the above-noted aqueous emulsion polymer compositions were evaluated and compared against commercial emulsions as follows.

The water resistance properties of the aqueous emulsion polymer compositions were determined using the standard TAPPI T441 OM-90 one hour Cobb test method (which is the measurement of liquid water mass that is absorbed on a specific area of printed polymer within one hour time period). Different printed polymers were prepared by applying Emulsions Nos. 1, 2, and 3 to Westvaco PRINTKOTE 12 point C2S Paperboard using a #5 Meyer Bar. For comparison purposes, different printed polymers were also prepared by applying J-74 (a styrene acrylic emulsion from Johnson Polymer) and LUCIDENE 605 (a styrene acrylic emulsion from Morton International) to Westvaco PRINTKOTE 12 point C2S Paperboard using a #5 Meyer Bar. Where the polymer was non-film forming at room temperature, a selected coalescing solvent (such as butyl carbitol from Eastman Chemical Company) was added to the emulsion prior to application. The resulting coating prints were dried in an oven at 110° C. for 30 seconds, then cut into a disc shape having area greater than 25 cm$^2$. The disc was weighted and mounted onto the Cobb device. Under a controlled environment of 50% relative humidity (+/−5%) and 72° F. (+/−2° F.), 25 g of DIW was placed in the cylinder of the Cobb device, and held for one hour. After water removal, the disc was towel dried and weighted. The reported one hour Cobb value (see Table I below) was the mass of water being absorbed per area of printed polymer in $g/m^2$ unit.

Grease resistance properties were determined using a modified TAPPI T-507 CM-85 test method. Each of the above-noted emulsions were applied to the uncoated side of Westvaco PRINTKOTE 16 point C1S Paperboard with a #7 Meyer Bar. Where the polymer was non-film forming at room temperature, a selected coalescing solvent (such as butyl carbitol from Eastman Chemical Company) was added to the emulsion prior to application. The resulting prints were dried at 72° F. (+/−2° F.) in 50% (+/−5%) relative humidity for at least one hour. In those cases where a coalescing solvent was used, the print was allowed to dry overnight. A plastic sheet containing 0.72–0.75 g of Wesson brand soybean cooking oil was then placed on the print in such a manner so that the oil was between the sheet and the print. After the assembly was placed in a 60° C. oven with the plastic sheet facing straight up for ten minutes, the plastic sheet was removed and the oil was carefully wiped off. The modified TAPPI T-507 CM-85 test value was the areas (in $mm^2$) of the print which was stained by the oil (see Table I below).

TABLE I

Grease and Water Resistance Properties

| Emulsion | Water Resistance One Hour Cobb Test ($g/m^2$) | Grease Resistance Modified Tappi Test ($mm^2$) |
|---|---|---|
| Emulsion 1[1] | 9–11 | 40–60 |
| Emulsion 2[2] | 5–7 | 10–30 |
| Emulsion 3[3] | 7–9 | 0–10 |
| J-74[4] | 13–15 | 55–65 |
| LUCIDENE 605[5] | 16–20 | 100–115 |

[1]See Example 1.
[2]See Example 2.
[3]See Example 3.
[4]A styrene acrylic emulsion from Johnson Polymer.
[5]A styrene acrylic emulsion from Morton International.

The one hour Cobb value was the mass of water being absorbed per area of printed polymer in $g/m^2$ unit. A one hour Cobb value of less than 10 $g/m^2$ indicates excellent water resistance, while a value of between 10 and 20 $g/m^2$ indicates good water resistance, and a value of more than 40 $g/m^2$ indicates poor water resistance.

The modified TAPPI T-507 CM-85 test value was the areas (in $mm^2$) of the print which was stained by the oil. A value of less than 30 $mm^2$ indicates excellent grease resistance, while a value of less than 60 $mm^2$ indicates very good grease resistance, a value of less than 100 $mm^2$ indicates good grease resistance, and a value of more than 100 $mm^2$ indicates poor grease resistance.

The data in Table I show that the aqueous polymer compositions of the present invention exhibited good to excellent water resistance properties and very good to excellent grease resistance properties.

EXAMPLE 6

The chemical resistance of an above-noted aqueous emulsion polymer composition was evaluated and compared against commercial emulsions as follows.

The respective chemical resistances of Emulsion No. 4, CS-4000 (an acrylic emulsion from Rohm Haas Company), and NEOCAR 6424 (an acrylic emulsion from Union Carbide) were determined using the standard ASTM D 1308 method. Each emulsion was applied to Lenetta N2C (paper from Lenetta Company) via a 1.5 ml Bird applicator. Where the polymer was non-film forming at room temperature, a selected coalescing solvent (such as butyl carbitol from Eastman Chemical Company) was added to the emulsion prior to application. After drying, 0.1 ml of each tested chemical was pipetted onto the respected coated panels and immediately covered with watch glass. After a period of two minutes, the chemical was wiped and the panel was examined. The results are shown in Table II below.

TABLE II

Chemical Resistance Properties

| Chemical | Emulsion 4[1] | CS-4000[2] | Neocar 6424[3] |
|---|---|---|---|
| Motor oil | 5 | 5 | 5 |
| Brake fluid | 5 | 1 | 3 |
| Skydrol[4] | 4–5 | 1 | 2 |
| Gasoline | 5 | 1 | 1–2 |
| EtOH[5] | 3–4 | 5 | 5 |
| 5% KOH[6] | 5 | 5 | 5 |
| Formula 409 Pro[7] | 4–5 | 3 | 5 |

[1]See Example 4.
[2]An acrylic emulsion from Rohm Haas Company.
[3]An acrylic aqueous emulsion from Union Carbide.
[4]A commercial cleaner from Solutia Company.
[5]A 50% ethanol solution.
[6]A 5% potassium hydroxide solution.
[7]A commercial cleaner from Clorox Company.

The chemical resistances were evaluated using a system wherein a reported value of 5 indicates a complete resistance to a particular chemical, while a value of 0 indicates no chemical resistance. The data in Table II show that the aqueous polymer composition of the present invention exhibited superior chemical resistances.

EXAMPLE 7

The moisture vapor transmission resistance, water resistance, and grease resistance of an above-noted aqueous emulsion polymer were evaluated and compared against a commercial emulsion as follows.

The respective moisture vapor transmission resistances (MVTR) of Emulsion No. 3 and J-74 (a styrene acrylic emulsion from Johnson Polymer) were determined using the standard ASTM 1653 method (which determines the MVTR by measuring the amount of moisture absorbed by paper). Each emulsion was formulated into a barrier coating by blending the emulsion with isopropyl alcohol and a defoaming agent. The respective emulsions were applied to PRINTKOTE C2S paper (from Westvaco Corporation) with a #8 Meyer bar. The paper was dried and placed coated side up over a Thwing Albert Vapometer Cup filled with 20 g of desiccant. The entire apparatus was placed into an oven heated to 60° C. for sixteen hours before measuring the increase in the weight of the paper due to absorbed moisture. The reported value was the amount of moisture absorbed by 100 square feet of the coated paper in a twenty-four hour period.

The water resistances of the formulated barrier coatings were determined using the standard TAPPI T-441 OM-90 one hour Cobb test method as described in Example 5 above.

The grease resistances of the formulated barrier coatings were determined using TAPPI 559PM96 test method. The formulated barrier coatings were applied to the uncoated side of Westvaco PRINTKOTE 16 point C1S Paperboard with a #7 Meyer Bar. The resulting prints were dried at 72° F. (+/−2° F.) in 50% (+/−5%) relative humidity for at least one hour. The 3M test was used as the reagent to determine grease resistance. There were ten oil reagents in the 3M kit test, where oil #1 has the least grease quality and oil #10 has the greatest grease quality. After placing one drop of oil #1 from the kit test on to the dried print, the oil was allowed to stay for 15 seconds, then wiped clean. If the print was not saturated with the tested oil, the test was repeated with the next higher number oil reagent. The test was continued until the print was saturated with oil, and that particular oil reagent number was reported. Thus, coatings with higher reported numbers exhibited greater grease resistance property.

TABLE III

Moisture Vapor Transmission Resistance, Grease Resistance, and Water Resistance of Barrier Coatings

| Barrier Coating | MVTR Value[1] | Water Resistance[2] | Grease Resistance[3] |
|---|---|---|---|
| Emulsion 3[4] | 16.0 | 1.4 | 9.0 |
| J-74[5] | 44.0 | 54.0 | 4.0 |

[1]The moisture vapor transmission resistance (MTVR) value is the amount of moisture (in grams) absorbed by 100 square feet of coated paper in a 24 hour period..
[2]The water resistance is the amount of water (in grams) absorbed per square meter of coated paper in a one hour period as determined by the standard TAPPI T-441 OM-90 Cobb test.
[3]The grease resistance is the number of oil reagent from the 3M kit test which saturated the dried print as determined by the standard TAPPI 559PM96 test. The number range is from 1 to 10, where 1 is the lowest grease resistance and 10 is the highest grease resistance.
[4]See Example 3.
[5]A styrene acrylic amulsion from Johnson Polymer Company.

The data in Table III indicated that the barrier coatings formulated with the polymer composition of the present invention exhibited better moisture vapor transmission resistance, water resistance, and grease resistance properties when compared to a standard acrylic polymer formulation.

EXAMPLE 8

A pigmented aqueous paint containing Emulsion No. 4 was formulated as shown in Table IV below. The grind paste was prepared by grinding the first portion of the listed ingredients in the indicated order at a high shear speed for 30 minutes. The second portion of the listed ingredients was then added to the grind paste in the indicated order and the letdown was mixed at low shear speed for 30 minutes, then filtered using a 400-mesh. The resulting paint (hereinafter referred to as "Paint No. 1")) had a volume solids level of 29.4% and volatile organic compound (VOC) content of 153.

TABLE IV

Paint Formulation

| MATERIALS | POUNDS | GALLONS |
|---|---|---|
| Grind Vehicle | | |
| Water | 277.2 | 33.28 |
| AMP 95[1] | 2.0 | 0.25 |
| Tamol 1124[2] | 8.9 | 1.00 |
| BYK 022[3] | 1.8 | 0.25 |

TABLE IV-continued

Paint Formulation

| MATERIALS | POUNDS | GALLONS |
|---|---|---|
| Katon LX 1.5%[4] | 1.6 | 0.19 |
| Acrysol RM 825[5] | 13.2 | 1.50 |
| Tronox CR-828[6] | 200.0 | 5.73 |
| Minex 7[7] | 50.0 | 2.30 |
| Letdown Vehicle | | |
| BYK 024[8] | 4.0 | 0.50 |
| Disperbyk 190[9] | 2.1 | 0.25 |
| Texanol[10] | 42.8 | 5.40 |
| Emulsion No. 4 | 428.4 | 49.24 |
| Water | 0.2 | 0.11 |
| TOTAL | 1032.2 | 100.00 |

[1]AMP 95 is 95% 2-amino, 2-methyl propanol from Angus Chemical Company.
[2]Tamol 1124 is a polymeric dispersion from Rohm Haas Company.
[3]BYK 022 is a silicone-based defoamer from BYK-Chemie U.S.A.
[4]Kathon LX is a preservative from Rohm Haas Company.
[5]Acrysol RM 825 is an acrylic thickener polymer from Rohm Haas Company.
[6]Tronox CR-828 is a titanium dioxide pigment from Kerr-Mcgee Chemical L.L.C.
[7]Minex 7 is a titanium pigment from Unimin Company.
[8]BYK 024 is a silicone-based defoamer from BYK-Chemie USA.
[9]Disperbyk 190 is a wetting additive from BYK-Chemie USA.
[10]Texanol is a solvent from Eastman Chemical Company.

EXAMPLE 9

A clear sealant was formulated as shown in Table V below wherein Emulsion No. 4 was employed as a bindter. The listed amounts of water, ammonium hydroxide, BYK 025 (a silicone-based defoamer from BYK-Chemie U.S.A.), and Dowanol DB (a butyl carbitol from Dow Chemical Company) was mixed in a vessel for a period of twenty minutes. The listed amount of Emulsion No. 4 was then added and the mixture was stirred for an additional thirty minutes. The resulting clear sealant (hereinafter referred to as "Sealant No. 1") had a volume solids level of 20.1% and volatile organic compound (VOC) content of 219.

TABLE V

Clear Sealant Formulation

| | Pounds | Gallons |
|---|---|---|
| Water | 379.2 | 45.52 |
| Ammonium hydroxide, 28% | 1.9 | 0.25 |
| BYK 025[1] | 4.0 | 0.50 |
| Dowanol DB[2] | 34.0 | 4.29 |
| Mix | | |
| Emulsion 4 | 430.1 | 49.44 |
| Total | 849.2 | 100.0 |

[1]BYK 025 is a silicon-based defoamer from BYK-Chemie U.S.A.
[2]Dowanol DB is butyl carbitol from Dow Chemical Company.

EXAMPLE 10

The chemical resistances of Paint No. 1 and Sealant No. 1 were evaluated as follows.

The respective chemical resistances of Stain No. 1 and Sealant No. 1 were determined using the standard ASTM D 1308 method. For comparison purposes, a commercial waterborne sealant (BEHR 910 from Behr Process) was also evaluated using the standard ASTM D 1308 method. Each coating composition was applied to a concrete paver substrate and allowed to dry for one week. Subsequently, 0.1 ml of each tested chemical was pipetted onto the respected coated substrates and immediately covered with a watch glass. After a period of two minutes, the chemical was wiped and the substrate was examined. The results are shown in Table VI below.

TABLE VI

Chemical Resistance Properties of Paint and Sealants

| Chemical | Paint No. 1[1] | Sealer No. 1[2] | Behr 910[3] |
|---|---|---|---|
| Water | 10 | 10 | 10 |
| Gasoline | 8 | 8 | 7 |
| Motor oil | 9 | 7 | 7 |
| Formula 409[4] | 10 | 7 | 8 |
| Transmission fluid | 10 | 10 | 9 |
| 5% NaOH[5] | 9 | 10 | 0 |

[1]See Example 8.
[2]See Example 9.
[3]A commercial waterborne sealant from Behr Process.
[4]A commercial cleaner from Clorox Company.
[5]A 5% potassium hydroxide solution.

The chemical resistances were evaluated using a system wherein a reported value of 10 indicates a complete resistance to a particular chemical, while a value of 0 indicates no chemical resistance. The data in Table VI show that the paint and sealer formulated with the aqueous polymer composition of the present invention exhibited superior chemical resistances.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. An aqueous polymer composition reaction product produced by reacting in an emulsion polymerization reaction a mixture comprising:
   (a) about 5.0% to about 60.0% by total weight of the mixture of a member selected from the group consisting of water-dispersible polymers having an average molecular weight in the range of about 2,000 to about 12,000 and combinations thereof;
   (b) about 2.0% to about 30.0% by total weight of the mixture of a member selected from the group consisting of fatty acids having an acid number of at least 100 and combinations thereof;
   (c) about 20.0% to about 93.0% by total weight of the mixture of a member selected from the group consisting of vinylic monomers and combinations thereof;
   (d) up to about 3.0% by total weight of the mixture of a chain transfer agent;
   (e) up to about 5.0% by total weight of the mixture of a surfactant selected from the group consisting of non-ionic surfactants, anionic surfactants, and combinations thereof;
   (f) a catalytic amount of at least one polymerization initiator; and
   (g) the balance of the mixture being water; to produce the polymer composition.

2. The polymer composition of claim 1 which further comprises the reaction product produced by reacting in an emulsion polymerization reaction a mixture comprising:
   (a) about 10.0% to about 30.0% by total weight of the mixture of a member selected from the group consisting of water-dispersible polymers having an average molecular weight in the range of about 5,000 to about 11,000 and combinations thereof;
   (b) about 4.0% to about 20.0% by total weight of the mixture of a member selected from the group consisting of fatty acids having an acid number of at least 100 and combinations thereof;
   (c) about 50.0% to about 86.0% by total weight of the mixture of a member selected from the group consisting of vinylic monomers and combinations thereof;
   (d) up to about 2.0% by total weight of the mixture of a chain transfer agent;
   (e) up to about 4.0% by total weight of the mixture of a surfactant selected from the group consisting of non-ionic surfactants, anionic surfactants, and combinations thereof;
   (f) a catalytic amount of at least one polymerization initiator; and
   (g) the balance of the mixture being water; to produce the polymer composition.

3. The polymer composition of claim 1 wherein the water-dispersible polymer of claim 1 (a) comprises a member selected from the group consisting of acrylic acid, methacrylic acid, fumaric acid, maleic anhydride, and combinations thereof.

4. The polymer composition of claim 1 wherein the fatty acid is a member selected from the group consisting of fatty acids containing from 12 to 24 carbon atoms and combinations thereof.

5. The polymer composition of claim 1 wherein the vinylic monomer is a member selected from the group consisting of styrenic monomers, acrylic monomers.

6. The polymer composition of claim 1 wherein the vinylic monomer is a member selected from the group consisting of acrylic acid, methacrylic acid, methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate, benzyl methacrylate, allyl methacrylate, 2-n-butoxyethyl methacrylate, 2-chloroethyl methacrylate, sec-butyl-methacrylate, tert-butyl methacrylate, 2-ethybutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2 methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate, tetrahydropyranyl methacrylate, methyl acrylate, ethyl acrylate, n-propyl acrylate, isopropyl acrylate, n-butyl acrylate, n-decyl acrylate, 2-ethylhexyl acrylate, salts of methacrylic acid, methacrylonitrile, methacrylamide, N-methylmethacrylamide, N-ethylmethacrylamide, N,N-diethymethacrylamide, N,N-dimethylmethacrylamide, N-phenyl-methacrylamide, methacrolein, salts of acrylic acid, acrylonitrile, acrylamide, methyl alpha-chloroacrylate, methyl 2-cyanoacrylate, N-ethylacrylamide, N,N-diethylacrylamide acrolein, vinyl acetate, vinyl chloride, vinyl pyridine, vinyl pyrollidone, sodium crotonate, methyl crotonate, crotonic acid, maleic anhydride, and combinations thereof.

7. The polymer composition of claim 1 wherein the chain transfer agent is a member selected from the group consisting of dodecyl mercaptan, mercaptoacetic acid, mercaptopropionic acid, octyl mercaptan, 2-mercaptoethanol, alkyl mercaptopropionates.

8. The polymer composition of claim 1 wherein the nonionic surfactant is a member selected from the group consisting of ethoxylated alkylphenols, ethoxylated fatty alcohols, ethylene oxide/propylene oxide block copolymers, and combinations thereof.

9. The polymer composition of claim 1 wherein the anionic surfactant is a member selected from the group consisting of alkyl sulfates, ether sulfates, phosphate esters, sulfonates, and combinations thereof.

10. The polymer composition of claim 1 wherein the polymerization initiator comprises from about 0.5% to about 5.0% by total weight of the mixture and is a member selected from the group consisting of thermal initiators, redox initiators, and combinations thereof.

11. The polymer composition of claim 10 wherein the thermal initiator is a member selected from the group consisting of hydrogen peroxide, t-butyl hydroperoxide, di-t-butyl peroxide, benzoyl peroxide, benzoyl hydroperoxide, 2,4-dichlorobenzoyl peroxide, t-butyl peracetate, azobisisobutyronitrile, isopropyl peroxycarbonate, and combinations thereof.

12. The polymer composition of claim 10 wherein the redox initiator is a member selected from the group consisting of cumene hydroperoxide-sodium metabisulfite, cumene hydroperoxide-iron (II) sulfate, and combinations thereof.

13. A moisture barrier coating composition comprising the polymer composition of claim 1.

14. A water resistant coating composition comprising the polymer composition of claim 1.

15. A grease resistant coating composition comprising the polymer composition of claim 1.

16. A chemical resistant coating composition comprising the polymer composition of claim 1.

17. An aqueous sealant comprising the polymer composition of claim 1.

18. An aqueous paint comprising the aqueous sealant of claim 1 and pigment.

* * * * *

UNITED STATES PATENT AND TRADEMARK OFFICE
CERTIFICATE OF CORRECTION

PATENT NO. : 6,713,548 B1
DATED : March 30, 2004
INVENTOR(S) : Sukun Zhang et al.

It is certified that error appears in the above-identified patent and that said Letters Patent is hereby corrected as shown below:

Column 6,
Line 24, delete "1,000" and insert therefor -- 11,000 --.

Column 13
Line 5, delete "3M test" and insert therefor -- 3M kit test --.

Column 16,
Line 33, delete "acrylic monomers." insert therefor -- acrylic monomers, methacrylic monomers, ethylenic monomers and combinations thereof. --.

Column 17,
Line 7, delete "mercaptopropionates." insert therefor -- mercaptopropionates, and combinations thereof. --.

Signed and Sealed this

Thirtieth Day of November, 2004

JON W. DUDAS
*Director of the United States Patent and Trademark Office*